April 13, 1954   G. D. BENTLEY   2,674,980
REVERSIBLE CALF TABLE

Filed Oct. 12, 1951   3 Sheets-Sheet 1

INVENTOR
GRANT D. BENTLEY

BY
McMorrow, Berman & Davidson
ATTORNEYS

April 13, 1954     G. D. BENTLEY     2,674,980
REVERSIBLE CALF TABLE
Filed Oct. 12, 1951     3 Sheets-Sheet 2
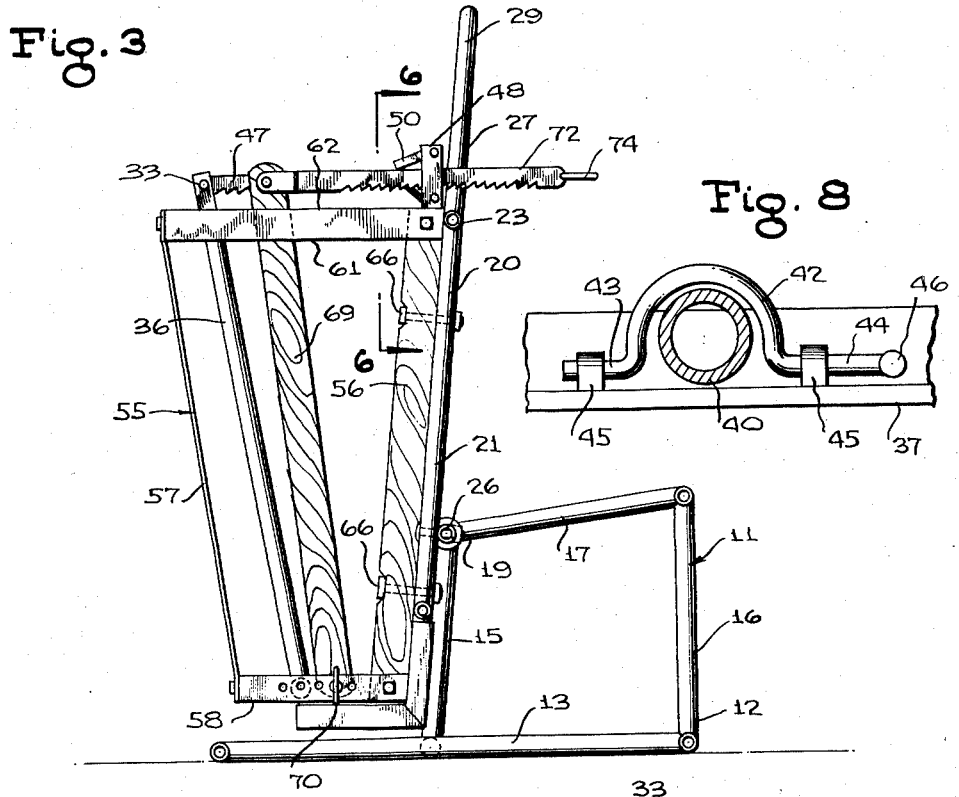
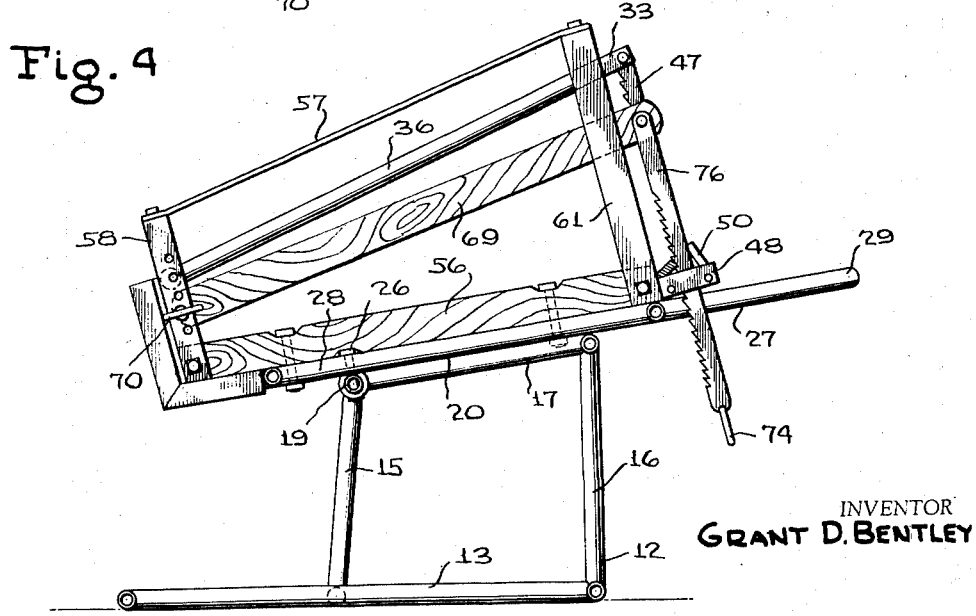
INVENTOR
GRANT D. BENTLEY
BY
McMorrow, Berman + Davidson
ATTORNEYS April 13, 1954 G. D. BENTLEY 2,674,980
REVERSIBLE CALF TABLE
Filed Oct. 12, 1951 3 Sheets-Sheet 3
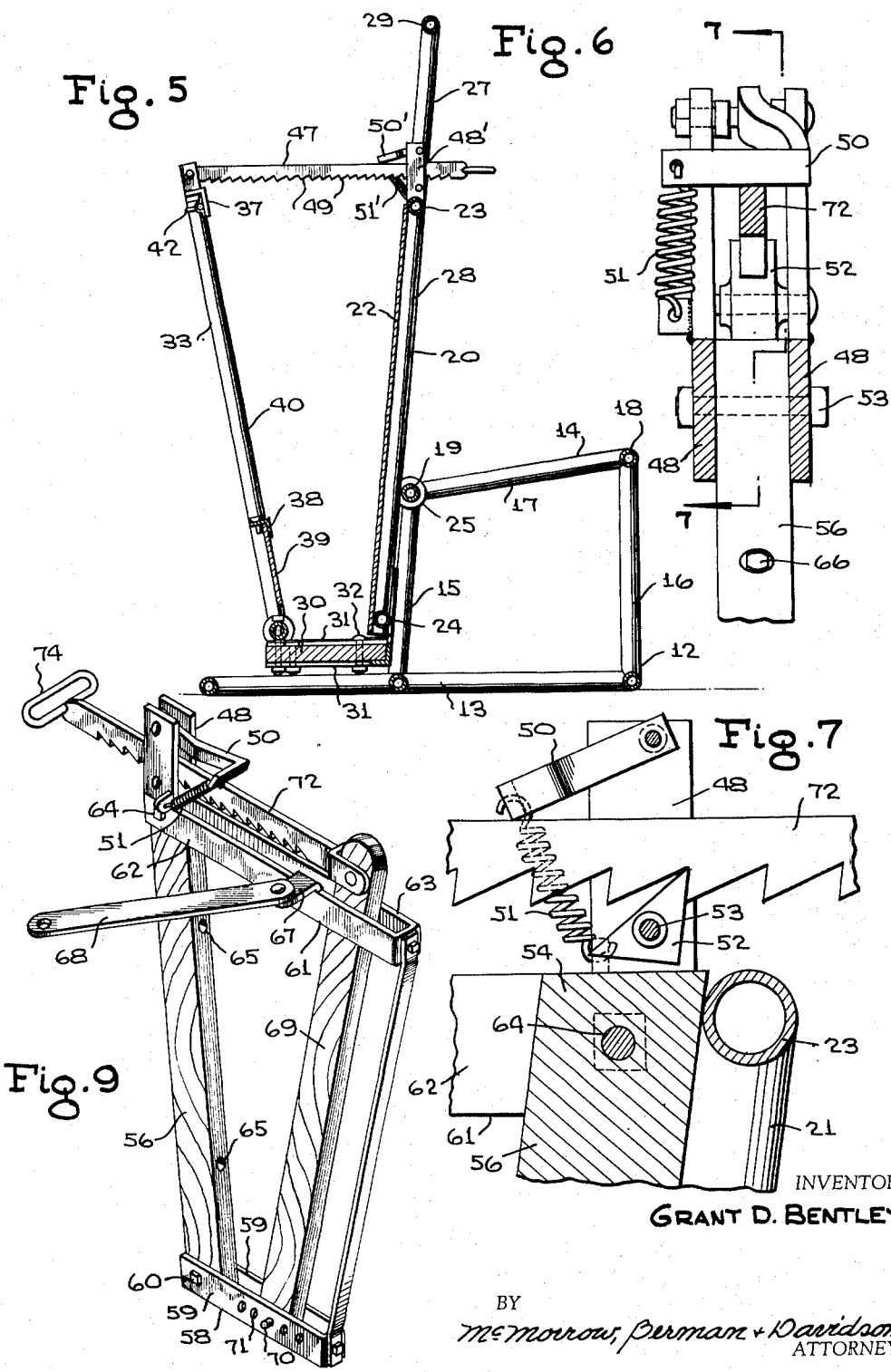

Patented Apr. 13, 1954

2,674,980

UNITED STATES PATENT OFFICE 2,674,980

REVERSIBLE CALF TABLE

Grant D. Bentley, Parker, Colo.

Application October 12, 1951, Serial No. 250,975

2 Claims. (Cl. 119—103)

This invention relates to animal restraining devices, and more particularly to devices especially adapted for holding calves and similar animals while being branded, dehorned, castrated, or the like.

A main object of the invention is to provide a novel and improved animal restraining device which is simple in construction, which enables calves and similar animals to be securely held while being operated upon, and which is easy to manipulate.

A further object of the invention is to provide an improved animal restraining device particularly adapted for holding calves and similar animals while being branded, dehorned, castrated, or the like, said device being inexpensive to manufacture, being sturdy in construction, being provided with means for holding the head as well as the body of the animal securely during the operation being performed on the animal, and being adjustable to accommodate animals of different sizes.

Further objects and advantages of the invention will become apparent from the following description and claims, and from the accompanying drawings, wherein:

Figure 3 is a front end elevational view of the animal restraining device of Figures 1 and 2.

Figure 4 is an end elevational view similar to Figure 3 but showing the tiltable portion of the device in its substantially horizontal position.

Figure 5 is a vertical cross sectional view taken on the line 5—5 of Figure 1.

Figure 6 is an enlarged cross sectional detail view taken on the line 6—6 of Figure 3.

Figure 7 is a cross sectional fragmentary detail view taken on the line 7—7 of Figure 6.

Figure 8 is an enlarged cross sectional detail view taken on the line 8—8 of Figure 1.

Figure 9 is a perspective detail view showing the stanchion device employed for clampingly securing the head of the animal, said stanchion device being shown detached from the main portion of the animal restraining device of Figures 1 to 8.

Figure 1:
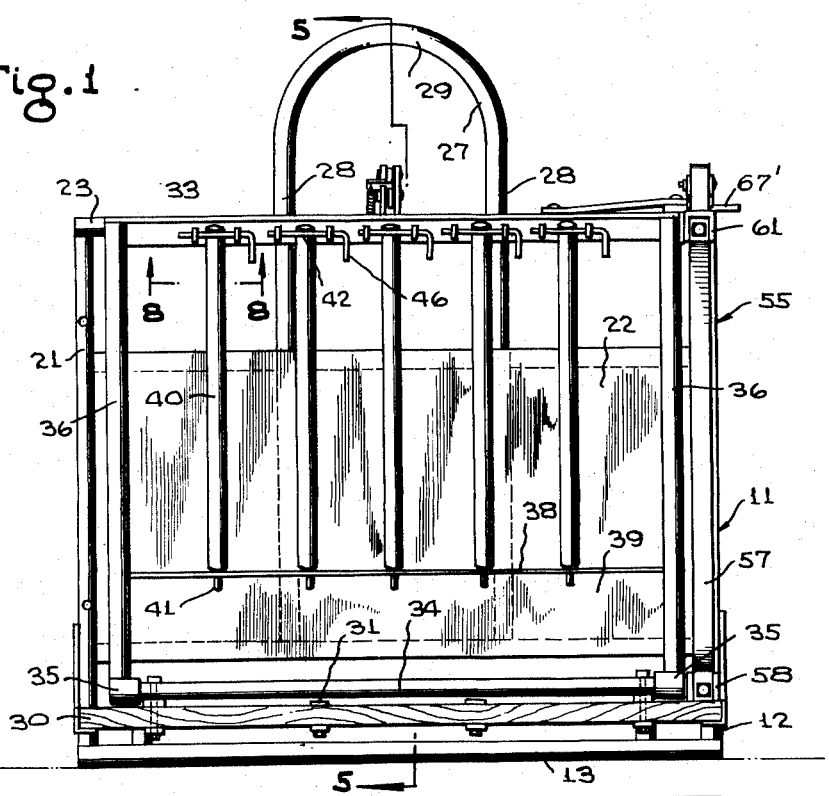
Figure 1 is a side elevational view of an improved animal restraining device constructed in accordance with the present invention.

Referring to the drawings, the animal restraining device is designated generally at 11 and comprises a base 12 formed of tubular rod material and comprising a bottom horizontal frame 13 adapted to rest on the ground and an upstanding frame portion 14 secured to one side of the base frame 13, as shown in Figures 3, 4 and 5. The upstanding frame portion 14 comprises the upstanding post elements 15 and 16 connected by the top bars 17, the top ends of the bars 16 being connected by a transverse bar 18 and the top ends of the post members 15 being traversed by a transverse bar 19.

Designated at 20 is a main gate member comprising side bars 21, 21 connected by a web of sheet metal 22 and by top and bottom transverse bars 23 and 24. The transverse bar 19 extends rotatably through respective sleeves 25, 25 rigidly connected to the respective bars 15 and 17 of the upstanding frame structure 14 at the opposite sides of said frame structure, and the transverse bar member 19 is bolted to the side bars 21, 21 at 26, 26 at the respective ends of the transverse bar 19, whereby the main gate member 20 is hinged to the upper inner side portion of the upstanding frame structure 14 for rotation around the horizontal tranverse axis defined by the bar 19.

The main gate element 20 includes an inner U-shaped frame member 27 having the respective legs 28, 28 extending parallel to the side bars 21, 21 and secured to the sheet metal wall portion 22. The bight portion of the U-shaped member 27 extends upwardly beyond the top edge of the main body of gate 12 and defines a handle 29 for rotating the main gate 20 around the horizontal transverse axis defined by bar member 19, as above described. Rigidly secured to the bottom margin of the main gate member 20 is a platform 30 which extends in a substantially horizontal direction when the main gate member 20 is in the position thereof shown in Figures 1, 2, 3 and 5, and which extends transversely over the frame base 13.

Figure 2:
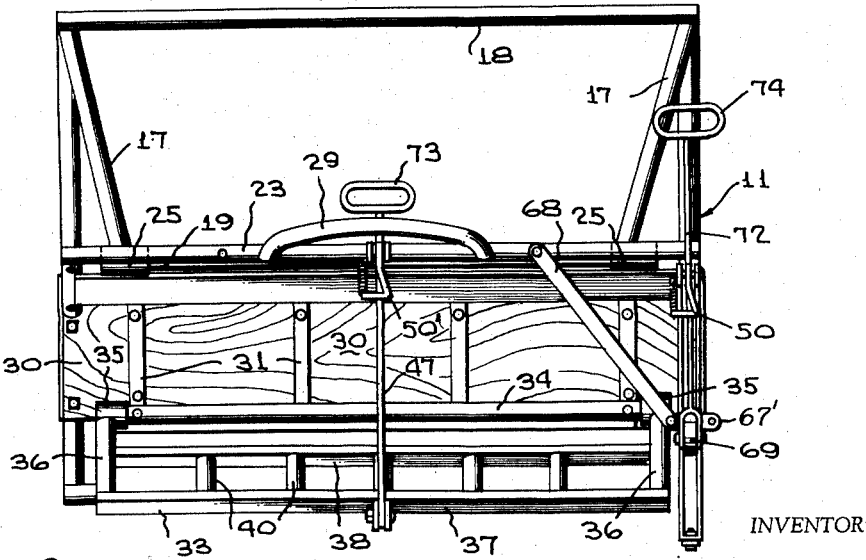
Figure 2 is a top plan view of the animal restraining device of Figure 1.

As shown in Figure 5, the platform 30 may comprise a relatively thick wooden plank on which are secured a plurality of transversely extending metal cleat bars 31, spaced apart in the manner shown in Figure 2 to provide a tread surface for an animal. The bottom of the plank may be provided with the transverse bars 31 as well as the top, to reinforce said plank and to stiffen the platform 30. The bars 31 on the top and bottom sides of the plank are connected by the securing bolts 32. Designated at 33 is an auxiliary gate member which is hinged to the outer marginal portion of the platform 30 for rotation around a horizontal axis parallel to the main gate member 20. As shown in Figure 2, a tubular bar 34 is bolted to the outer marginal portion of the platform 30 and respective caps 35, 35 are rotatably engaged on the ends of the tubular bar 34. Rigidly connected to the caps 35 are the respective side bars 36. Side bars 36 are connected together by top and bottom angle bars 37 and 38, the lower portions of the side bars 36 being further connected by a transverse plate member 39 secured to the depending flange of the lower angle bar 38, as shown in Figure 5. Designated at 40 are a plurality of spaced bar members arranged parallel to the side bars 36, 36 and formed at their lower ends with reduced axial studs 41 engaged in apertures formed in the top flange of the transverse angle bar 38. The top ends of the bars 40 are disposed under the top flange of the upper angle bar 37 and are engaged in respective pivoted yokes 42 carried by the depending flange of angle bar 37. As shown in Figure 8, each yoke 42 comprises a curved bight portion and respective aligned ends 43 and 44 rotatably mounted in spaced apertured lugs 45 secured to the depending flange of angle bar 37. The end 44 is formed with a rightangled extension 46 serving as a handle for rotating the yoke when it is desired to disengage the top end of the bar 40 from the yoke. As shown in Figure 1, the handles 46 are normally in depending positions, and in these positions the bight portions of the yoke members extend at right angles to the handles 46 and are adapted to retain the top ends of the bars 40 in spaced parallel positions in the auxiliary gate 33. By rotating the handles 46 upwardly and outwardly, the bight portions of the yoke members 42 may be elevated to free the bar members 40 for removal from the auxiliary gate 33 when desired.

Pivotally connected to the intermediate portion of the upper angle bar 37 is a ratchet lever 47 which extends through parallel yoke plates 48' secured to the intermediate portion of the top bar 23 of the main gate member 20, the ratchet bar 47 having teeth 49 on its bottom edge which are engaged by pawl means carried in the lower portion of the yoke member 48' and which is biased downwardly against said pawl means by an abutment arm 50' pivoted between the upper portions of the yoke plates 48' and urged downwardly by a spring 51' connecting the free end portion of the member 50' to the bar 23, the member 50' being provided with a transversely extending portion overlying the top edge of the ratchet bar 47 and urging said ratchet bar downwardly into engagement with the pawl means. Said pawl means may comprise a triangular dog 52 secured between the lower portions of the yoke plates 48 by a transverse pin or rivet 53, as shown in Figure 7, and restrained against rotation by the subadjacent structure, in the manner shown in Figure 7 at 54.

Designated at 55 is a stanchion member comprising a generally trapezoidal frame having the upwardly diverging side bars 56 and 57. The member 57 may comprise a flat metal bar and the member 56 may comprise a wooden bar, as shown in Figure 9, the lower end of the bar 57 being connected to the wooden bar 56 by a U-shaped horizontally extending bracket 58. As shown in Figure 9, the bracket 58 comprises the respective legs 59, 59 disposed on opposite sides of the lower end of the wooden bar 56 and secured thereto by a transverse bolt 60. The top end of bar 57 is connected to the top end of the wooden bar 56 by an elongated, U-shaped bracket member 61 having the respective side bars 62 and 63 disposed on opposite sides of the top end of the wooden bar 56 and secured thereto by a transverse bolt 64. The wooden bar 56 is formed with the spaced apertures 65, 65 through which the bar 56 may be bolted to either of the side bars 21 of main frame 20, as by bolts 66, whereby the stanchion device 55 may be secured to either end of the main gate 20, depending upon which direction an animal is to be held in the restraining device. The side leg 62 is formed with a horizontally projecting lug 67 to which is connected a brace bar 68 which in turn is connected to the top bar 23 of the main gate 20, as shown in Figure 2. If desired, the stanchion member 55 may be shifted to the end opposite to that shown in Figure 2 by connecting a horizontally disposed lug 67' on the side leg 63 of the bracket member 61 through the top bar 23 of the frame 20 by means of the brace bar 68. The stanchion device 55 may thus be rigidly secured to the main gate 20 at either end of said main gate, as above described. Designated at 69 is a clamping bar which is mounted in the trapezoidal frame of the stanchion 55, the lower end of the bar 69 being pivotally connected in a desired position of adjustment between the side arms 59, 59 of the bottom transverse brace member 58, as by a pin 70 engaged through selected openings 71 in the side arms 59, 59 and extending through the lower end of the clamping bar 69. The upper portion of the clamping bar 69 extends slidably through the upper transverse bracket member 61 between the arms 62 and 63 thereof, and has pivotally connected thereto the ratchet bar 72 which extends through parallel yoke plates 48 secured to the top end of the bar 56. As shown in Figures 6 and 7, pivotally secured between the lower portions of yoke plates 48 is the triangular dog 52 which is engageable with the teeth on the lower edge of the ratchet bar 72, said dog being restrained against rotation by the subadjacent top surface 54 of bar 56. Pivoted between the upper portions of the yoke plates 48 is the abutment member 50 having the transversely extending arm engaging the top edge of the ratchet bar 72 and connected by a spring 51 to the subadjacent structure 54, biasing the abutment member 50 downwardly and urging the ratchet bar 72 into locking engagement with the pawl member 52, as above explained. The ratchet bars 47 and 72 are provided at their free ends with handles, shown respectively at 73, and 74.

In utilizing the device, an animal is first guided or driven between the main gate member 20 and the auxiliary gate member 33 with the main gate member 20 in its substantially vertical position, as shown in Figures 1 to 3. The stanchion device 55 receives the head portion of the animal and the main body of the animal is received between the main gate 20 and the auxiliary gate 33. The head of the animal is then clamped by pulling the handle 74, whereby the clamping bar 69 of the stanchion device 55 is moved to clamping position toward the bar 56, and the body of the animal is clamped in the device by pulling the handle 73, whereby the auxiliary gate 33 is rotated toward the main gate 20. The respective ratchet levers 47 and 72 are locked by the engagement of the respective dogs 52 with the bottom teeth of the ratchet bars. The animal is thus securely clamped in the device and the device may be tilted to the substantially horizontal position thereof shown in Figure 4, in which position the required operation may be performed on the animal.

To provide access to any localized portion of the animal, as for example to the rear portion of the animal for performing castration on the animal, the bar members 46 adjacent to the rear portion of the animal may be removed, in the manner above described, by rotating the locking handles 46 upwardly and outwardly to release the upper portions of the bars 46 which are to be removed, enabling the required operation to be performed on the animal at said localized portion, the other portions of the animal being retained securely clamped in the device.

To release the ratchet bars 72 and 47, it is merely necessary to elevate the abutment members 50 manually, allowing the ratchet bars to be lifted out of engagement with respect to their dog members 52, and allowing the clamping bar 69 and auxiliary gate 32 to be swung outwardly to released positions.

While a specific embodiment of an improved animal restraining device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal restraining device comprising a base, an upstanding frame rigidly mounted on said base, a tiltable main gate member pivoted to the upper side portion of said frame and being rotatable around a horizontal axis from a substantially vertical position alongside the frame to a substantially horizontal position resting on top of the frame, said main gate member including spaced parallel bar members, a platform secured to the bottom margin of said gate member, an auxiliary gate member hinged to said platform for rotation around an axis parallel to said main gate member, the ends of said auxiliary gate member being spaced inwardly of the bar members of said main gate member, adjustable latch means connecting the upper portions of said gate members, said gate members being adapted to receive the body of an animal therebetween and to clampingly engage said body to hold the animal in the device, a stanchion member adapted to receive and clampingly engage the animal's head, said stanchion member comprising a generally trapezoidal frame, a clamping bar pivoted to the bottom of said trapezoidal frame and extending through the top of said last named frame, adjustable latch means connecting said clamping bar to one side of said last named frame, and means selectively securing said stanchion member to a side bar of said main gate member, whereby said stanchion member may be secured at either end of said main gate member.

2. An animal restraining device comprising a base, an upstanding frame rigidly mounted on said base, a tiltable main gate member pivoted to the upper side portion of said frame and being rotatable around a horizontal axis from a substantially vertical position alongside the frame to a substantially horizontal position resting on top of the frame, said gate member including spaced parallel bar members, a platform secured to the bottom margin of said gate member, an auxiliary gate member hinged to said platform for rotation around an axis parallel to said main gate member, the ends of said auxiliary gate member being spaced inwardly of the bar members of said main gate member, adjustable latch means connecting the upper portions of said gate members, said gate members being adapted to receive the body of an animal therebetween and to clampingly engage said body to hold the animal in the device, a stanchion member adapted to receive and clampingly engage the animal's head, said stanchion member comprising a pair of upwardly diverging side bars, a first horizontal member connecting the lower ends of said side bars, a second horizontal member connecting the upper ends of said side bars, a clamping bar pivoted to said first horizontal member and extending upwardly between the side bars adjacent said second horizontal member, a ratchet bar pivoted to the top of said clamping bar and extending over the top of one of the side bars, and pawl means carried by said one of the side bars lockingly engaging said ratchet bar, and means selectively securing said stanchion member to one said bar member of said main gate member.

References Cited in the file of this patent

UNITED STATES PATENTS

| Number | Name | Date |
|---|---|---|
| 259,349 | Wilson et al. | June 13, 1882 |
| 538,442 | Driver | Apr. 30, 1895 |
| 545,415 | Schecher | Aug. 27, 1895 |
| 576,541 | Brent et al. | Feb. 9, 1897 |
| 630,131 | Tarr | Aug. 1, 1899 |
| 652,103 | Ground et al. | June 19, 1900 |
| 658,128 | Smith | Sept. 18, 1900 |
| 980,015 | Sheesley | Dec. 27, 1910 |
| 1,234,044 | Kugler | July 17, 1917 |
| 1,286,425 | Schafer | Dec. 3, 1918 |
| 1,363,054 | Poppenga, Jr. | Dec. 21, 1920 |
| 1,443,561 | Clark | Jan. 30, 1923 |
| 2,234,366 | Carter | Mar. 11, 1941 |
| 2,446,769 | Keirsey | Aug. 10, 1948 |
| 2,478,883 | Thompson et al. | Aug. 9, 1949 |
| 2,483,909 | Keirsey | Oct. 4, 1949 |
| 2,518,146 | Johnson et al. | Aug. 8, 1950 |
| 2,520,585 | Walker et al. | Aug. 29, 1950 |
| 2,554,558 | Bush | May 29, 1951 |
| 2,557,477 | Simon | June 19, 1951 |
| 2,576,654 | Thorson | Nov. 27, 1951 |